United States Patent
Morano et al.

(10) Patent No.: US 7,039,610 B2
(45) Date of Patent: May 2, 2006

(54) IMPLIED MARKET TRADING SYSTEM

(75) Inventors: Matt N. Morano, Tenafly, NJ (US); Iain West, Loughton (GB); Kai Neumann, Brooklyn, NY (US)

(73) Assignee: New York Mercantile Exchange, Inc., New York, NY (US)

( * ) Notice: Subject to any disclaimer, the term of this patent is extended or adjusted under 35 U.S.C. 154(b) by 0 days.

(21) Appl. No.: 09/971,172

(22) Filed: Oct. 4, 2001

(65) Prior Publication Data

US 2003/0069830 A1   Apr. 10, 2003

(51) Int. Cl.
*G06F 17/60* (2006.01)

(52) U.S. Cl. ................. 705/37; 705/35; 705/36 R

(58) Field of Classification Search ............ 705/35–37, 705/10, 80, 412
See application file for complete search history.

(56) References Cited

U.S. PATENT DOCUMENTS

| | | | |
|---|---|---|---|
| 4,677,552 A | 6/1987 | Sibley, Jr. | |
| 4,903,201 A | 2/1990 | Wagner | |
| 4,980,826 A | 12/1990 | Wagner | |
| 5,787,402 A * | 7/1998 | Potter et al. | 705/37 |
| 6,047,274 A * | 4/2000 | Johnson et al. | 705/412 |
| 6,418,419 B1 * | 7/2002 | Nieboer et al. | 705/37 |
| 2002/0070915 A1 | 6/2002 | Mazza et al. | |
| 2003/0009419 A1 | 1/2003 | Chavez et al. | |
| 2003/0023542 A1 | 1/2003 | Kemp, II et al. | |
| 2003/0200167 A1 | 10/2003 | Kemp, II et al. | |
| 2003/0236737 A1 | 12/2003 | Kemp, II et al. | |
| 2004/0049738 A1 | 3/2004 | Thompson et al. | |
| 2004/0064395 A1 | 4/2004 | Mintz et al. | |
| 2004/0093300 A1 | 5/2004 | Burns | |
| 2004/0103054 A1 | 5/2004 | Singer | |
| 2004/0148242 A1 | 7/2004 | Liu | |
| 2004/0153391 A1 | 8/2004 | Burns et al. | |
| 2004/0153392 A1 | 8/2004 | West et al. | |
| 2004/0153393 A1 | 8/2004 | West et al. | |
| 2004/0153394 A1 | 8/2004 | West et al. | |
| 2004/0210514 A1 | 10/2004 | Kemp, II et al. | |

FOREIGN PATENT DOCUMENTS

| | | | |
|---|---|---|---|
| GB | 0407026 A2 * | 1/1991 | |
| GB | 0411748 A2 * | 2/1991 | |
| JP | 2000353196 A * | 12/2000 | |
| JP | 2001222591 A * | 8/2001 | |

OTHER PUBLICATIONS

PEAKE, The National Book System, An Electronically Assisted Auction Market, pp-02290-pp-02353 (Apr. 30, 1976).

INTEX, The International Futures Exchange (Bermuda) Limited, Functional Specifications, pp-01932-pp-01999 (Aug. 1981).

* cited by examiner

*Primary Examiner*—Hani M. Kazimi
*Assistant Examiner*—Narayanswamy Subramanian
(74) *Attorney, Agent, or Firm*—Akin Gump Strauss Hauer & Feld, LLP

(57) ABSTRACT

A computer based trading system implies spread markets from multiple real or implied spread markets. In particular, one aspect of the invention permits implication of a spread market from a combination of inter-commodity and inter-calendar spread orders. Furthermore, another aspect of the invention allows use of nontradeable implied or bridge markets to combine with other implied or real markets to create further tradeable implied markets. The method described herein thereby permits the creation of all implied markets that are inherent in the combination of futures, calendar spread and inter-commodity spread real orders.

8 Claims, 9 Drawing Sheets

|  | June | August | September |
|---|---|---|---|
| Crude Oil | Buy 5<br>Buy 5<br>Buy 5 | Sell 10<br>Sell 5 | Sell 15<br>Sell 5 |

Prior Art
Figure 2

IMPLIED MARKET TRADING SYSTEM

CROSS-REFERENCE TO RELATED APPLICATIONS

Not applicable.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention
2. Description of the Related Art

The present invention relates to a system for trading in a futures trading market. A futures contract is a supply contract between a buyer and seller, whereby the buyer is obligated to take delivery and the seller is obligated to provide delivery of a fixed amount of a commodity at a predetermined price at a specified location. Futures contracts are traded exclusively on regulated exchanges and are settled daily based on their current value in the marketplace.

Futures contracts are traded on several centralized auction markets, run by various futures exchanges. These auction markets are typically open outcry markets. In these markets, the contracts are standardized for delivery of a specified quantity of the underlying commodity.

Open outcry trading originally took place on a physical trading floor where brokers exchange bids and offers for futures contracts on the trading floor. The executed trades are then recorded by hand or entered into an electronic recording system. The completed trades are later sent to an external or internal clearinghouse to process the trades and issue appropriate reports to the futures exchange and its members.

Futures markets are also maintained on electronic trading systems. These electronic trading systems allow entry of a bid or offer for a particular futures contract. These simple bids and offers are called outright orders, consisting of a single ended transaction. Outright orders are contrasted with spreads, discussed in more detail below. The orders are time stamped by the trading system as they are entered into the system. The system then matches a bid with an appropriate offer, if such an offer exists. The bids and offers are matched on a price and time priority basis, i.e., the first entered order will first be matched to an opposite order having the same price. The trading system may then generate appropriate information for the clearinghouse.

Another type of order, more complex than an outright, that can be placed into a trading system is called a "spread" order. A spread order is the simultaneous purchase and sale of futures contracts for different months, different commodities, or different grades of the same commodity. Each bid and offer component of a spread is termed a bid leg and an offer leg, respectively. A spread order is not executed until both the legs are satisfied. For example, the trader can offer to sell July crude oil and simultaneously offer to buy February crude oil. This is sometimes termed a calendar spread, or an "inter-calendar" spread. A calendar spread is a futures trading position comprised of the purchase and sale of two futures contracts of the same type that have different expiration dates. A calendar spread is also known in the art as a horizontal, or time spread. Other types of spreads are possible. For example, the trader can simultaneously bid to purchase one kind of futures contract while offering to sell a second type of futures contract for the same month. This kind of spread may be termed an "inter-commodity" spread. An example of an inter-commodity spread is a crack spread, which is the simultaneous purchase or sale of crude oil against the sale or purchase of refined petroleum products. These spread differentials which represent refining margins are normally quoted in dollars per barrel by converting the product prices into dollars per barrel (by multiplying the cents-per-gallon price by 42) and subtracting the crude oil price.

Real orders are orders that are entered into the system by traders. The traders enter the appropriate information into the trading system and release the order into the system as an open order. Real orders may be entered into any tradable contract on the system including, but not limited to, futures, options, inter-commodity spreads, intra-commodity spreads, futures strips, etc.

Implied orders, unlike real orders, are generated by the system on the behalf of traders who have entered outright orders. Implied orders have been generated to provide order combinations which could not be directly entered into a trading system. In order to do this, the system examines the outright orders entered into the system and derives orders, which are implicit in the combination of specific outright orders. An implied spread may be derived for one or more real outrights or real spreads which have a common and offsetting leg. Two or more orders are common when a leg of each order occurs in the same month for the same commodity. Two or more orders are offsetting when the common leg of one order is opposite, i.e. bid versus offer, the common leg of another order. The system then creates the "derived," or "implied," order and displays the market that results from the creation of the implied order as a market that may be traded against. If a trader trades against this implied market, then the real orders that combined to create the implied order and the resulting market are executed as matched trades.

The creation of implied markets involve the existence somewhere of a real market —that is, a market for which a trader has entered an order into the system. These orders may be for an individual or outright future market or for a spread market and will create real outright future and real spread markets respectively. Depending on what real markets exist there is the potential for both implied outright futures and implied spreads markets to be generated.

There are at least three ways in which implieds can be generated but all depend on the existence of at least two real markets or orders:

Two real future (outright) orders can create an implied spread market.

Two real spread orders can create an implied spread market.

A real future (outright) order and a real spread order can create an implied future market.

In general, for an implied order (market) generation, the three examples given are the genesis for all implied markets.

Creation of Implied Spread from Real Future Orders

If a buy and a sell order exist for different futures months, then two real markets exist. However, because they are for different months they create an implied spread market between the two. The volume for the implied spread, by definition, is the minimum of the two real volumes that make up the market. For example, in prior art FIG. 1 there is a future buy order for 5 lots of crude oil, deliverable in June. In addition, there is a future sell order for 10 lots of crude oil, deliverable in August. These two orders create an implied spread to buy 5 lots of crude oil, deliverable in June, while simultaneously selling 5 lots of crude oil, deliverable in August.

If another trader enters a sell order, a third real future market and a second implied spread market is generated by the trading system. The volume available for this implied spread market is the minimum of the volume in the real markets which make it up. For example, in prior art FIG. 2 in addition to the two orders cited in FIG. 1, there is a sell order for 15 lots of crude oil, deliverable in September. Two implied spreads are now created. First, there is an implied spread to buy 5 lots of crude oil, deliverable in June, while simultaneously selling 5 lots of crude oil, deliverable in August. There is a second implied spread to buy 5 lots of crude oil, deliverable in June, while simultaneously selling 5 lots of crude oil, deliverable in September.

In prior art FIG. 3, if a buy order is subsequently entered for October then two extra implied spread markets are created. This is because the new buy order implies against both of the existing sell orders in the system. The two new orders are: a spread order to sell lots deliverable in August while buying lots deliverable in October, and a spread order to sell lots deliverable in September while buying lots deliverable in October.

Creation of Implied Spreads from Real Spreads

The existence of two spread orders for differing months will create two real spread markets. If there is one common and offsetting leg between these orders then a third spread market will be implied. The volume available for the new spread market is the minimum of the real volumes which have contributed to that market. For example, in prior art FIG. 4 there is a spread order to buy 5 lots of crude oil in July while selling 5 lots of crude oil in August. There is a second spread order to buy 15 lots of crude oil in August while selling 15 lots of crude oil in September. This creates an implied spread to buy 5 lots of crude oil in July while selling 5 lots of crude oil in September.

Creation of Implied Futures from Real Futures and Real Spreads

Implied future markets can only be generated if there is an existing real future market which can be associated with one leg of an existing real spread. The result is actually an implied buy future market with the volume being the minimum of the two real volumes. For example, in prior art FIG. 5, because of a real order there is an outright market to buy 5 lots of crude oil in July. There is a spread order to sell 15 lots of crude oil in July, while buying 15 lots of crude oil in August. This creates an implied outright market to buy 5 lots of crude oil in August.

It is advantageous for the trading system to have the ability to generate as many implied markets as possible. Each additional implied market created increases the likelihood that trades will occur. As described above, in the past trading systems have only been able to generate relatively simple implied markets. Moreover, these systems can only generate implied markets for orders within a single commodity or for orders between commodities but only by combining futures and spread orders. Accordingly, there is a need for a method to create more implied calendar and inter-commodity spread markets by combining calendar spreads from one commodity with inter-commodity spread markets between that commodity and another. This is accomplished through the use of nontradeable, implied bridge markets.

BRIEF SUMMARY OF THE INVENTION

According to one aspect of embodiments of the present invention, a method for a computer based trading system implies spread markets from multiple real or implied spread markets. In particular, one aspect of the invention permits implication of a spread market from a combination of inter-commodity and inter-calendar spread orders. Furthermore, another aspect of the invention allows use of non-tradeable implied or bridge markets to combine with other implied or real markets to create further tradeable implied markets. The method described herein thereby permits the creation of all implied markets that are inherent in the combination of futures, calendar spread and inter-commodity spread real orders. This increases the likelihood that the real orders will be matched and trades executed.

BRIEF DESCRIPTION OF THE SEVERAL VIEWS OF THE DRAWINGS

FIG. 2 is a diagram of the prior art depicting an example of the creation of multiple implied spread markets from real future orders.

DETAILED DESCRIPTION OF THE INVENTION

Figure 1:
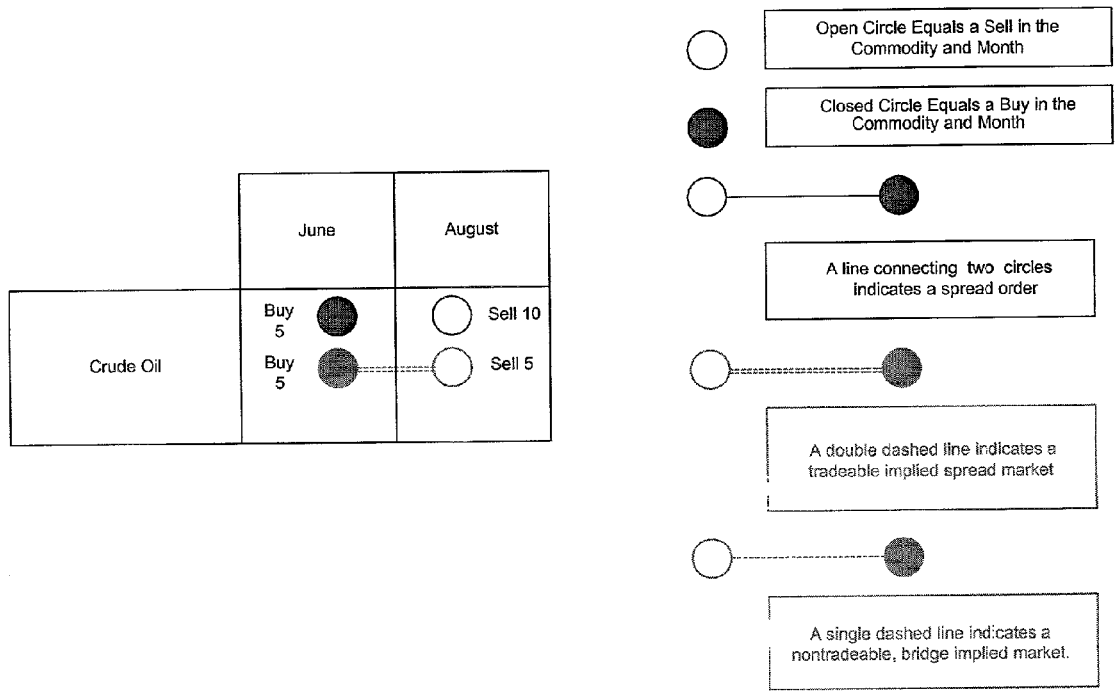
FIG. 1 is a diagram of the prior art depicting an example of generation of a tradable implied market from two real future orders.
Figure 3:
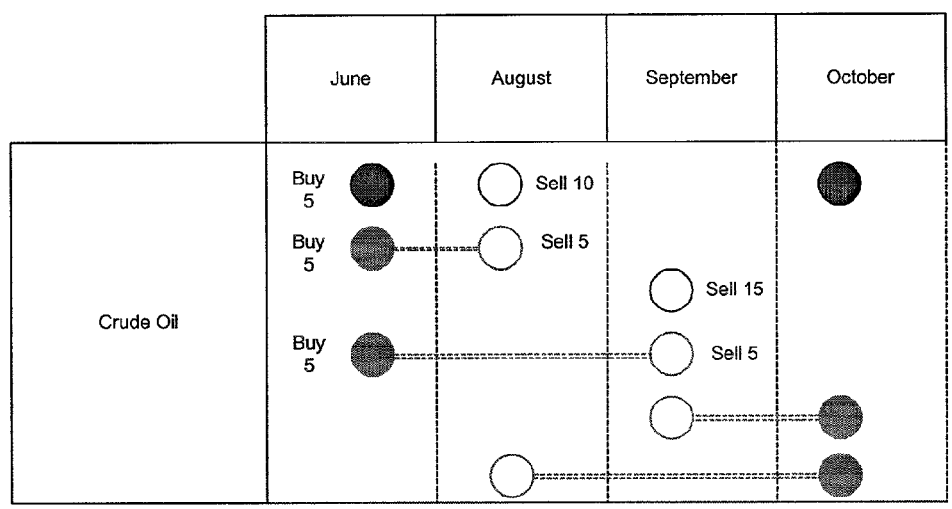
FIG. 3 is a diagram of the prior art depicting an example of creation of multiple implied spread orders from real future orders.
Figure 4:
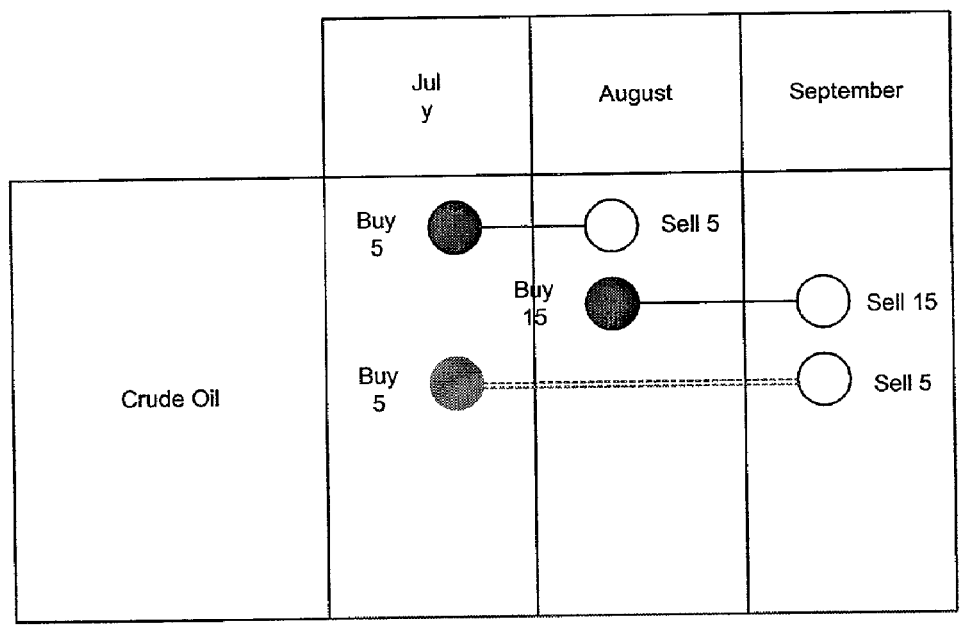
FIG. 4 is a diagram of the prior art depicting an example of the generation of a tradable implied spread market from two real spread orders.
Figure 5:
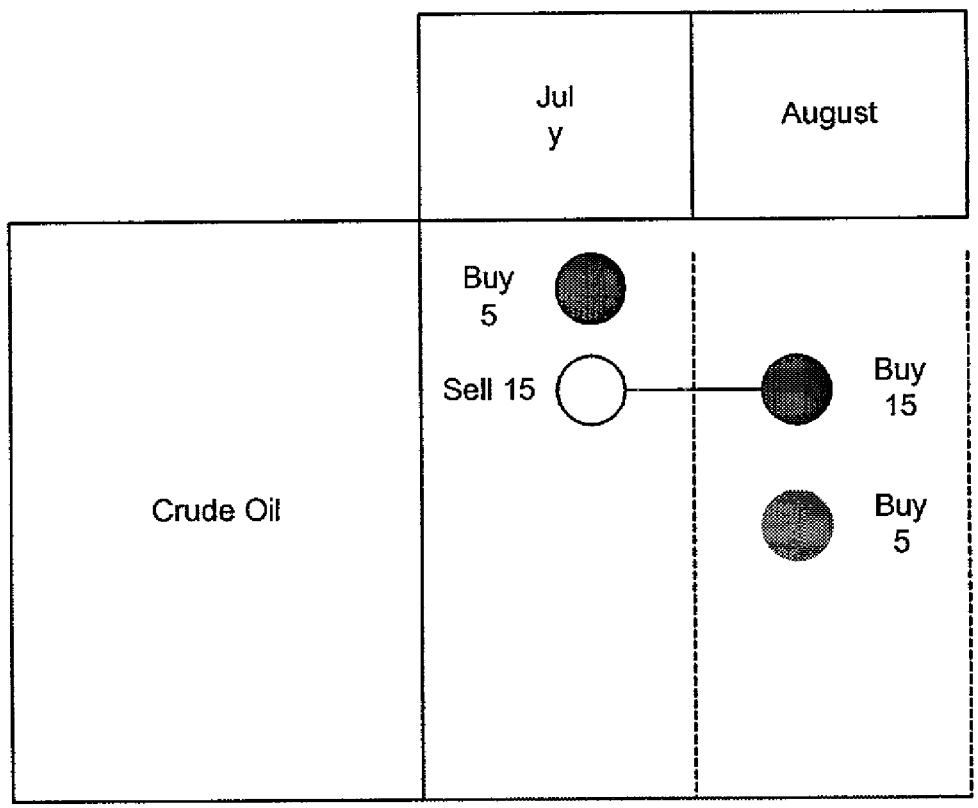
FIG. 5 is a diagram of the prior art depicting an example of the creation of implied futures from real futures and real spreads.
Figure 6:
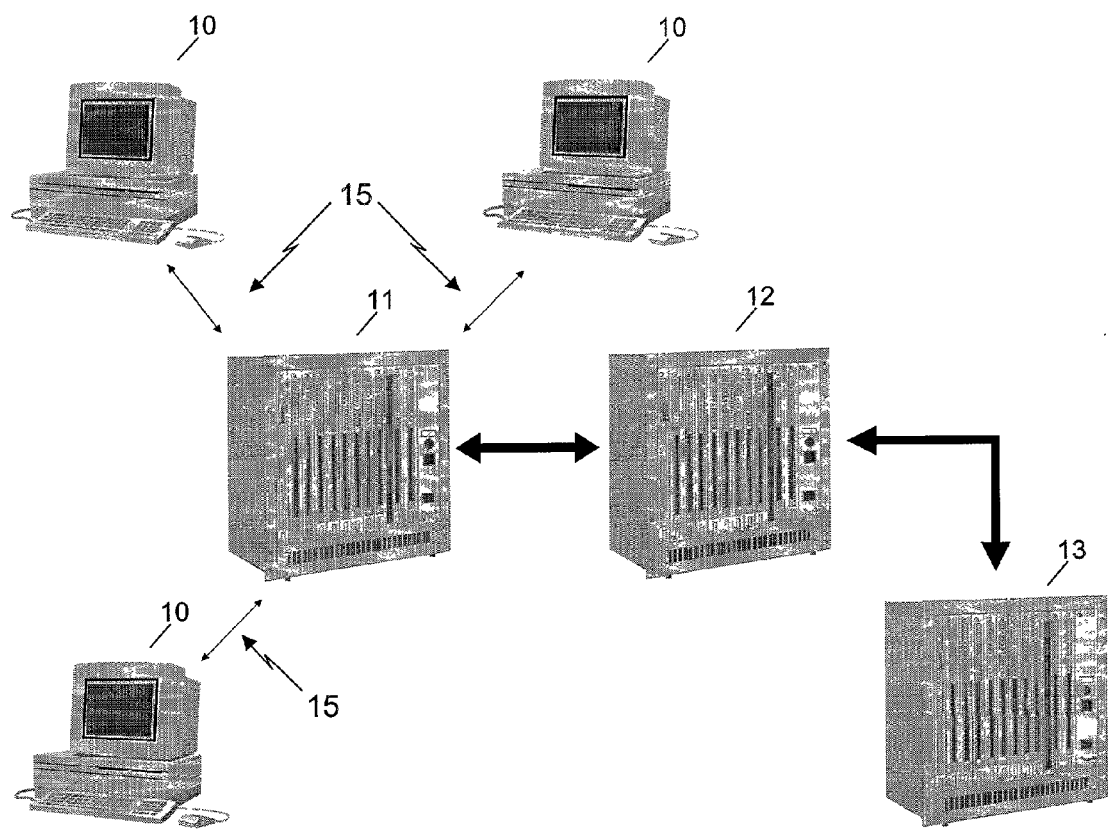
FIG. 6 is an exemplary embodiment of a system for implementing the implied trading method disclosed herein.

FIG. 6 is a representation of a typical futures contract trading network. This particular embodiment includes a trade matching system 11 which is connected to trading stations 10 via a telecommunications network 15, LAN, or other network. The trade matching system 11 receives orders from the trading stations 10 via a communication network 15. Specifically, the trader enters a bid or offer for a futures contract at the trading station. Each bid or offer typically includes identification of the type of futures contract to be traded, the number of lots, or contracts, the trader wishes to buy or sell, and the price at which the contracts are to be bought or sold. Additional information such as trader or trader terminal identification may also be transmitted. The bid or offer is then transmitted to the trade matching system 11 via the network 15. As described further below, the trade matching system 11 examines the bid or offer, compares the bid or offer with any existing real or implied markets, then matches the bid or offer with the real orders that generated the opposing real or implied market. The trade matching system 11 may perform other functions, such as a gatekeeping function to prohibit traders from exceeding certain trading limits.

The trade matching system 11 in the embodiment of FIG. 6 is further connected to a clearing system 12 via the network. The clearing system 12 accepts matched trade information from the trade matching system 11. In a selected embodiment, the matched trade information is transmitted at the end of each trading day. The matched trade information is then processed using various accounting and reporting procedures. In another embodiment, trade data may be transmitted to the other systems during the trading session. The data from these procedures may be used by the trading exchange, or the exchange members, to track trades, manage trading accounts, and other functions.

The clearing system 12 is connected to a compliance system 13. The compliance system 13 accepts matched trade and other data from the clearing system 12. The compliance system 13 generates reports that, among other things, flag suspect trading practices, including trade ahead, prearranged trading, and fairness violations.

In a selected embodiment, the trade matching system 11 is an "open-outcry" system. All bids and offers from all traders are traded against each other in this open-outcry system. Those of skill in the art will appreciate that other trade matching systems are possible without departing from the scope of the invention. For example, the trade matching system 11 may incorporate a "counterparty" trading function, where traders can limit their offer or bids to be traded only with particular traders.

In a selected embodiment, the trade matching system 11 matches trades on a price and time priority basis. The trade matching system 11 stores the bids and offers transmitted from the trading stations. In the case of an outright offer, the system then compares the price of the offer for a particular commodity to the price of each bid for the same commodity. If only one bid price matches the offer price, a matched trade is created from the bid and offer. If multiple bids match the offer price, the system determines which bid was entered into the system first. The first-in-time bid is matched with the offer. If any remaining volume exists to the offer order after its match with the first-in-time bid, then the offer order will continue to match with the second-in-time bid, and so on until there is no more volume left to match at the offer price. If the price of multiple bids matches with the price of multiple offers, the first-in-time offer order at the particular price is matched with the first-in-time bid at the same price. These first-in-time orders continue to match until they have no more volume to match. Next, the second-in-time orders match until they have no more volume, and so on until no more volume is left to match at the particular price. Other trade matching protocols may be implemented without departing from the present invention. For example, instead of a price and time protocol, a volume and price protocol may be implemented where priority is given to specified volumes of orders.

According to one embodiment, bids and offers are matched without regard to the number of lots, or contracts, associated with the bid or offer. Thus, if the lot size of a matched bid and offer differ, the matched trade will include the common number of lots. The remaining lots will remain in the trade matching system 11 for a subsequent trade at the unfilled order's price.

For spread orders, the trade matching system 11 compares the spread order offers to buy (or sell) with other real or implied spread order offers to sell (or buy). If both legs of the spread orders match, a matched spread trade is created. As with real future offers and bids, the implied spread markets created by the trade matching system 1 are tradeable in variable lot sizes. If the size of the lots between an outright offer and an outright bid differ, the trade matching system 11 will imply a spread for the common number of lots. If the implied spread is matched in a lot size less than the common number of lots of the orders on which the implied is based, then the residual implied volume will remain in the system as matchable.

Upon a newly entered order, the system will have previously created all possible implied markets based on the preexisting orders prior to the entry of the new order. The system searches for a match of a newly entered order by either an opposing real or implied market. The trading system treats for trade matching purposes both implied and real markets in the same manner. Since the system creates all possible implied markets between futures, calendar spreads and one-to-one inter-commodity spreads, all possible implied markets are displayed (at the best price for a contract). If there is to be a match with the newly entered order, then the system will show the opposite matchable market, whether it be real or implied. Therefore, if an order is to match, it will match immediately in its own market. This greatly improves the chances that a match will be found and a trade completed.

Furthermore, the trading system treats implied markets and real markets as equals in regards to price and time priority. For example, if an implied market is created by a set of real orders whose combined latest timestamp is earlier than a real order at the same price, then the set of orders that combined to generate the implied market will take priority over the real order at the same price. The implied markets are time-stamped only if they are at the best price for a particular market.

It will be appreciated that the system of FIG. 6 is but illustrative. The components of the system can be distributed in a wide variety of ways, and the functionality can be redistributed among the various components, all without detracting from the spirit of the invention. Further, various trading models and different types of trading information can be used again without detracting from the spirit of the invention.

The creation of multiple implied spread markets then increases the likelihood that an opposing spread order will be submitted to the trading system and a match between the real orders and the opposing spread order will occur. The display of the implied market increases the likelihood of a match in two ways: one, it is a form of advertisement that may entice other traders to enter an opposing order for the spread, and, two, it represents a link between the real futures market and the spread market or between two other spread markets. In other words, without the implied market link between the futures market and the calendar spread market or between the two spread markets, the real futures or spread orders that would otherwise create the implied spread market will not match against an order entered opposite the would be implied market, i.e., the system doesn't know of the match because it doesn't know of the implied market.

Only tradable orders are displayed to a trader. Such tradable orders include real outright orders, real spread orders, implied outright orders and implied spread orders. Furthermore, under existing systems, only tradable orders or markets could be implied from existing real and implied markets. For example, a spread market across multiple commodities of different months could not be implied at all.

Figure 7:
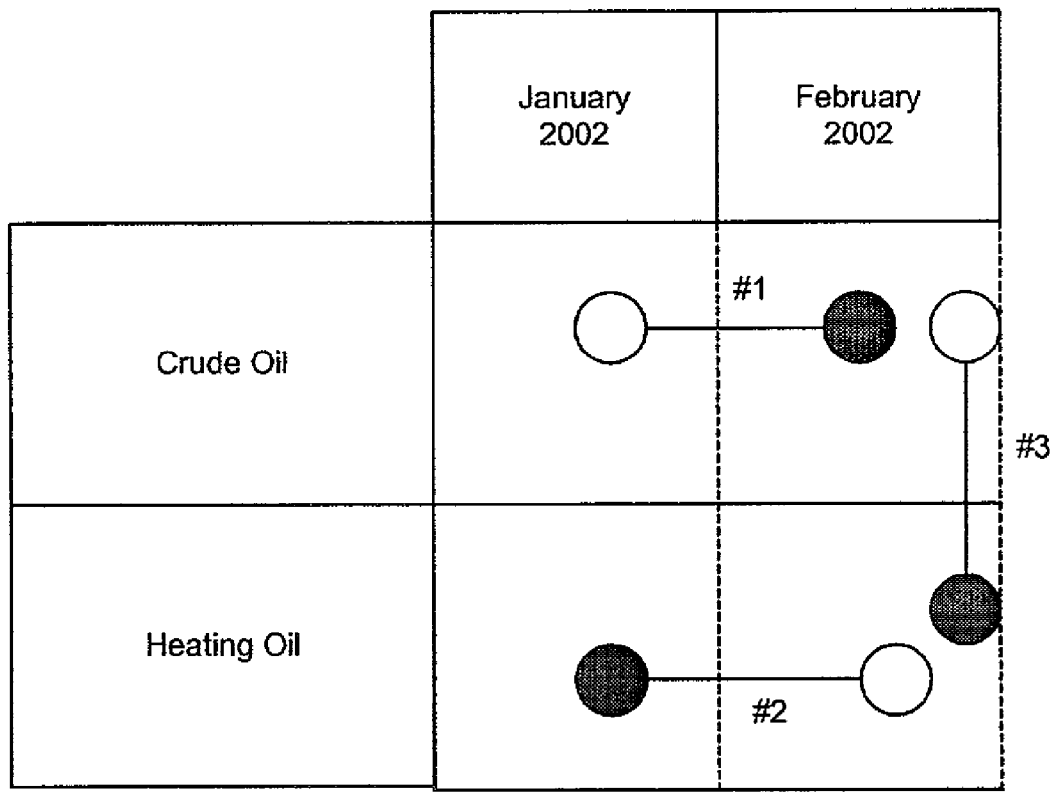
FIG. 7 is a diagram depicting an example of multiple spread markets.

FIG. 7 illustrates a situation where a tradable solution exits but could not be displayed due to implied market limitations. Specifically, there are three outright or "real-"spread orders (and markets). There are two calendar spreads, spread #1, buy February crude oil and sell January crude oil, and spread #2, buy January heating oil and sell February heating oil. There is also one inter-commodity spread order (and the associated market), represented by spread #3, sell February crude oil and buy February heating oil. In this example, only a real inter-commodity spread of buy January crude oil and sell January heating oil would cause the real spreads #1, 2 and 3 to execute. However, under existing systems, such a solution would not be displayed to give notice that such a market existed. This is so because neither an implied inter-commodity spread nor an implied calendar spread could be generated from any two of the real spreads #1, 2 or 3 (tradable inter-commodity spreads must be for the same month for both commodities).

Figure 8:
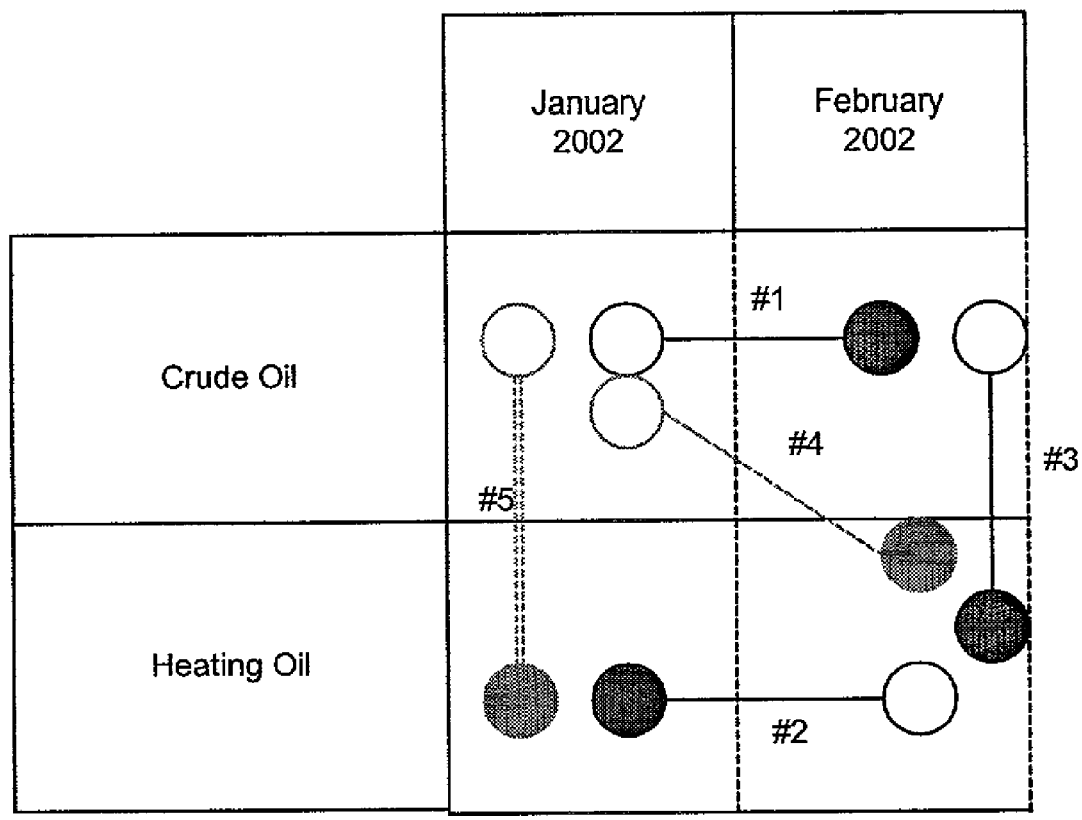
FIG. 8 is a diagram depicting an example of generation of an implied non-tradable spread and tradeable spread for the spread markets of FIG. 7.

Turning to FIG. 8, according to an embodiment of the disclosed invention, the trading system 11 is able to generate implied spreads from more than two real spreads by creating implied spreads that are non-tradable, bridge markets. FIG. 8 represents how a selected embodiment can generate an inter-commodity spread from multiple real inter-commodity spreads and real inter-calendar spreads. Spread #1 and spread #3 combine to imply spread #4, a non-tradable spread to sell January crude oil and buy February heating oil. The trade matching system 11 internally generates the "inter-commodity inter-calendar" spread #4.

The "inter-commodity inter-calendar" spread #4 is not an available or tradable spread to a broker. That is, while inter-commodity spreads can actually be entered by a broker, and inter-calendar spreads can similarly be entered, the "inter-commodity intercalendar" spread #4 is preferably internally implemented by the trading system strictly to allow matching with other spreads.

The implied spread #4 is derived from the open orders of spread #1 and spread #3. Specifically, the February crude oil portion of the calendar spread #1 is satisfied by the sell February crude oil portion of the inter-commodity spread #3. However, because both portions of a spread must be satisfied before the spread can be executed, the implied spread #4 is derived from the unsatisfied sell January crude oil of spread #1 and the unsatisfied buy February heating oil of spread #3. The trade matching system 11 uses the common and offsetting legs of real spreads #1 and #3 to derive the implied spread #4. In the example of FIG. 8, spreads #1 and #3 are common because each spread consists of a leg for crude oil in the month of February. These spreads are offsetting because the common leg of spread #1 is a bid to buy and the common leg of spread #3 is an offer to sell. The implied spread #4 consists of the legs of spreads #1 and #3 which are not common and offsetting.

This implied spread #4 is non-tradable because present day systems do not allow entry of such an order directly to buy January crude oil and sell February heating oil. Although this spread is non-tradable, implied spread #4 is generated automatically by the trading system and used to generate other implied spread (and future) markets. The trading system utilizes the non-tradable implied spread #4 internally. The trading system uses these implied markets as "bridges" to other implied markets. In this example in FIG. 8, the trading system internally generates the implied spread #4 to sell January crude oil and buy February heating oil and combines it with spread #2, buy January heating oil and sell February heating oil to generate implied spread #5, sell January crude oil and buy January heating oil.

The creation of implied spread #5 is the result of both the creation of implied spread #4 from two real spread orders, spread #1 and spread #3, and the combination of the non-tradable implied spread #4 and the real spread #2. Ultimately, the trading system creates the implied spread #5 because two real spread orders created an implied spread order that was then combined with another real spread order. Thus, spread #5 is generated as a tradable spread which is then displayed to provide notice to traders of this additional available market, thus encouraging additional trading. The tradable implied spread #5 is generated based in part on the non-tradable implied spread #4. When real orders combine in this way, their implied markets may be considered first-generation implied markets. According to an embodiment, these first-generation implied markets may be combined with other markets, real and implied, to create second-generation implied markets, and so on until all possible implied markets have been created.

Those of skill in the art will recognize that the same techniques may be used to generate any of the markets depicted in FIG. 8. In another example, if spreads #1, #3 and opposite of #5 are all real spreads, the trade matching system 11 can generate an implied spread opposite of spread #2. Similarly, if spreads #1, #2 and opposite of #5 are real spreads, the trade matching system 11 may generate an implied spread opposite of spread #3.

Figure 9:
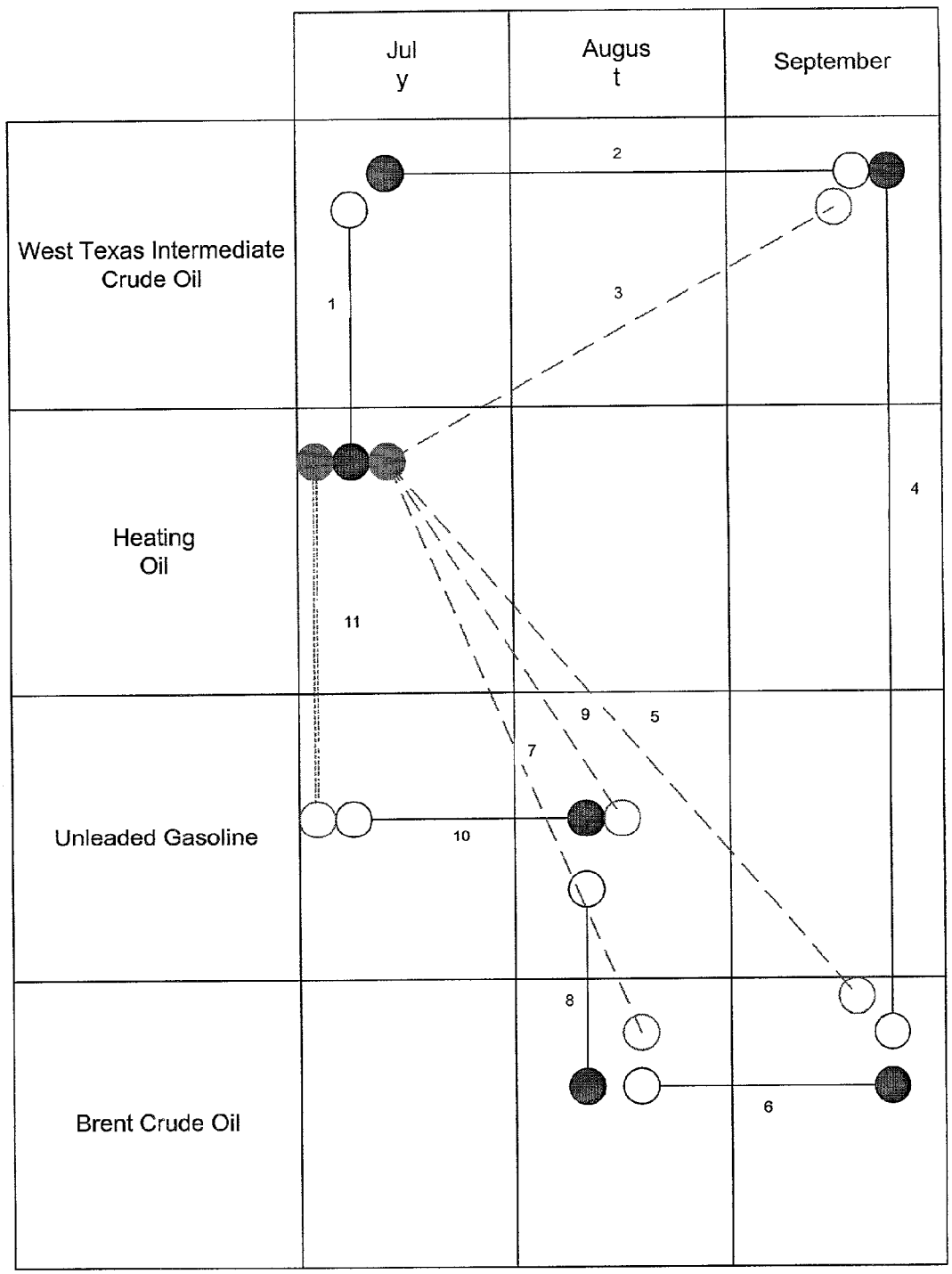
FIG. 9 is a diagram of the disclosed subject matter depicting a complex example for the creation of a tradable implied market from multiple real spread markets and multiple non-tradable implied markets.

The prior example can be expanded to illustrate generation of implieds from inter-commodity and calendar spreads within the complex of linked markets. The orders depicted in FIG. 9 can be represented in a shorthand formula set as follows:

$$S1+S2=S3, S3+S4=S5, S5+S6=S7, S7+S8=S9, S9+S10=S11$$

S1, S2, S4, S6, S8 and S10 comprise the real spread orders while S3, S5, S7 and S9 comprise the nontradable implied spreads, or bridge spreads, and S11 is a tradable implied spread. Each of the implied spreads are generated based on the common and offsetting legs of other spreads. Specifically, implied spreads S3, S5, S7 and S9 consist of the non-common and non-offsetting components of the spreads on which the implied spread is derived. Since spread S11 is the only tradable implied spread generated, it alone is the only implied spread displayed on the trading screen. If a trader entered S12, for example, an order opposite and matchable against spread S11, then the following real spread orders would trade: S1, S2, S4, S6, S8 and S10. Thus, multiple real spread orders of different types, i.e. inter-commodity and inter-calendar, are combined to generate nontradable implied orders which then are used by the trading system to derive a tradable implied order creating an associated market.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

We claim:

1. A computer-implemented method for generating implied spread markets from multiple spread orders, comprising the steps of:

storing a first spread order;

storing a second spread order, the second spread order of a different order type than the first spread order and having a common and offsetting leg with the first spread order; and generating a first implied spread order based on the first spread order and the second spread order, wherein the step of storing a first spread order, the step of storing a second spread order, and the step of generating a first implied spread order are implemented on a computer.

2. The method of claim 1, further comprising the steps of:

storing a third spread order having a common and offsetting leg with the first implied spread order; and generating a second implied spread based on the third spread and the first implied spread order.

3. The method of claim 1, wherein one or more of the first and second spread orders is a real spread order.

4. The method of claim 1, wherein one of the first or second spread orders is an inter-commodity spread order.

5. The method of claim 1, wherein one of the first or second spread orders is an inter-calendar spread order.

6. The method of claim 1, further comprising the step of:

comparing the second implied spread order with other orders to find a matched trade.

7. The method of claim 1, further comprising the step of:

generating matched trade information for the first, second and third spread orders after the second implied spread order has been matched.

8. The method of claim 1, wherein the first implied spread order is a non-tradable implied spread order.

* * * * *

UNITED STATES PATENT AND TRADEMARK OFFICE
CERTIFICATE OF CORRECTION

PATENT NO. : 7,039,610 B2  Page 1 of 1
APPLICATION NO. : 09/971172
DATED : May 2, 2006
INVENTOR(S) : Matt N. Morano, Lain West and Kai Neumann It is certified that error appears in the above-identified patent and that said Letters Patent is hereby corrected as shown below:

Column 2, line 43 - "real" should be underlined

Column 6, line 9 - "trade matching system 1" should be --trade matching system 11--

Column 7, line 7 - "exits" should be --exists--

Column 7, line 8 - "real-" should be --real--

Column 7, line 39 - "intercalendar" should be --inter-calendar--

Signed and Sealed this

Ninth Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 7,039,610 B2  Page 1 of 1
APPLICATION NO. : 09/971172
DATED : May 2, 2006
INVENTOR(S) : Morano et al.

It is certified that error appears in the above-identified patent and that said Letters Patent is hereby corrected as shown below:

Please insert item [73], International Petroleum Exchange of London, Ltd., London UK Signed and Sealed this Seventeenth Day of April, 2007

JON W. DUDAS
*Director of the United States Patent and Trademark Office*